United States Patent
Vo et al.

(10) Patent No.: US 10,554,254 B2
(45) Date of Patent: Feb. 4, 2020

(54) MULTI-ANTENNA IMPULSE UWB RECEIVER

(71) Applicant: COMMISSARIAT A L'ENERGIE ATOMIQUE ET AUX ENERGIES ALTERNATIVES, Paris (FR)

(72) Inventors: Tien-Tu Vo, Grenoble (FR); Frederic Hameau, Grenoble (FR); Laurent Ouvry, Grenoble (FR); Venceslass Rat, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/227,913

(22) Filed: Dec. 20, 2018

(65) Prior Publication Data
US 2019/0199399 A1 Jun. 27, 2019

(30) Foreign Application Priority Data
Dec. 21, 2017 (FR) ..................... 17 62768

(51) Int. Cl.
*H04B 1/00* (2006.01)
*H04B 1/7163* (2011.01)
(52) U.S. Cl.
CPC ............................... *H04B 1/71637* (2013.01)
(58) Field of Classification Search
CPC ..... H04B 1/71637; H04B 1/16; H04B 7/0413
See application file for complete search history.

(56) References Cited

U.S. PATENT DOCUMENTS

2005/0249298 A1* 11/2005 Kim ..................... H04L 5/026
375/260
2008/0317160 A1* 12/2008 Tzeng .................... H04B 1/707
375/295

FOREIGN PATENT DOCUMENTS

CN 106533518 A 3/2017

OTHER PUBLICATIONS

French Preliminary Search Report dated Sep. 19, 2018 in French Application 17 62768, filed on Dec. 21, 2017 (with English Translation of Categories of Cited Documents).
Alwan, E., et al. "Coding-based ultra-wideband digital beamformer with significant hardware reduction", Analog Integrated Circuits and Signal Processing, vol. 78, No. 3, 2013, 13 pages.
Kaiser, T., et al. "An Overview of Ultra-Wide-Band Systems With MIMO", Proceedings of the IEEE, vol. 97, No. 2, 2009, 28 pages.
Tzeng, F., et al. "A CMOS Code-Modulated Path-Sharing Multi-Antenna Receiver Front-End", IEEE Journal of Solid-State Circuits, vol. 44, No. 5, 2009, 15 pages.

* cited by examiner

*Primary Examiner* — Dhaval V Patel
(74) *Attorney, Agent, or Firm* — Oblon, McClelland, Maier & Neustadt, L.L.P.

(57) ABSTRACT

An impulse UWB signal multi-antenna receiver with an RF front-end shared between the various antennas. The receiver includes a code multiplexing stage upstream of the RF front-end, and a code demultiplexing stage downstream of this front-end. The codes used for multiplexing and demultiplexing are orthogonal codes with timing a sub-multiple of the chip timing of the code used at transmission for modulation of the impulse UWB signal.

10 Claims, 5 Drawing Sheets

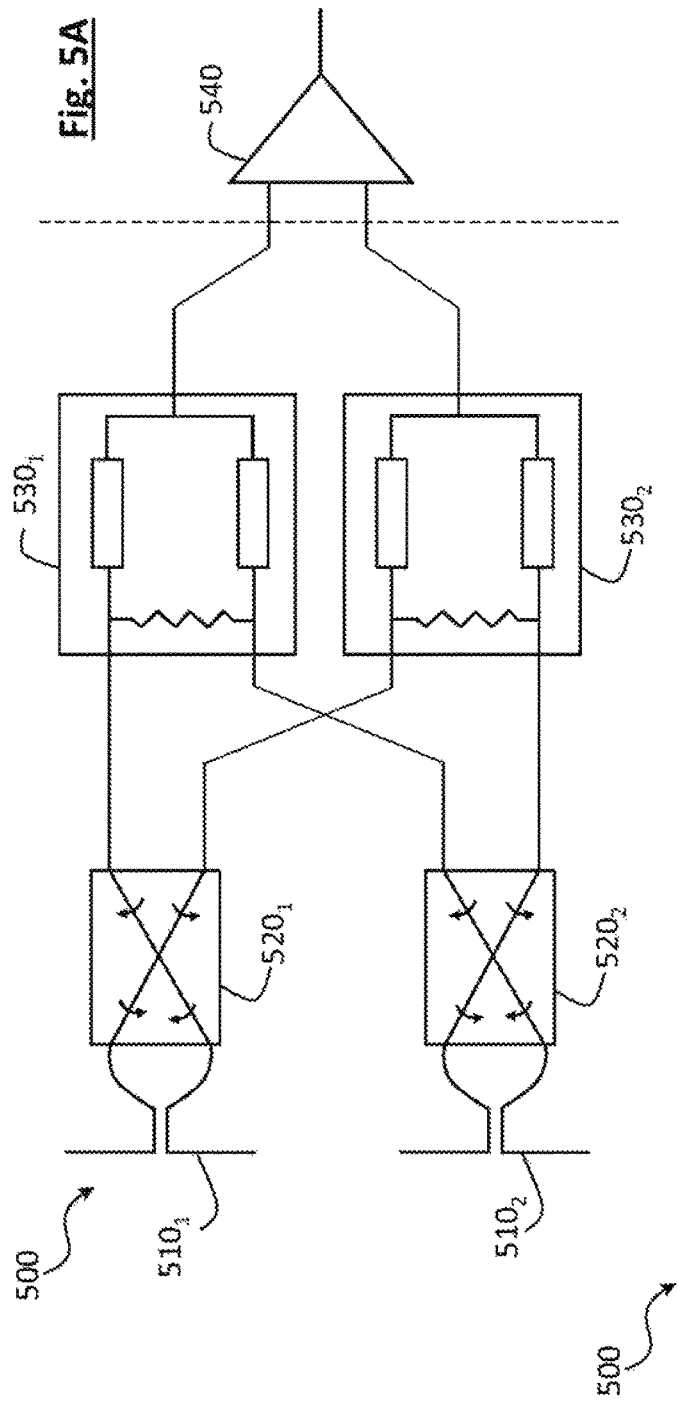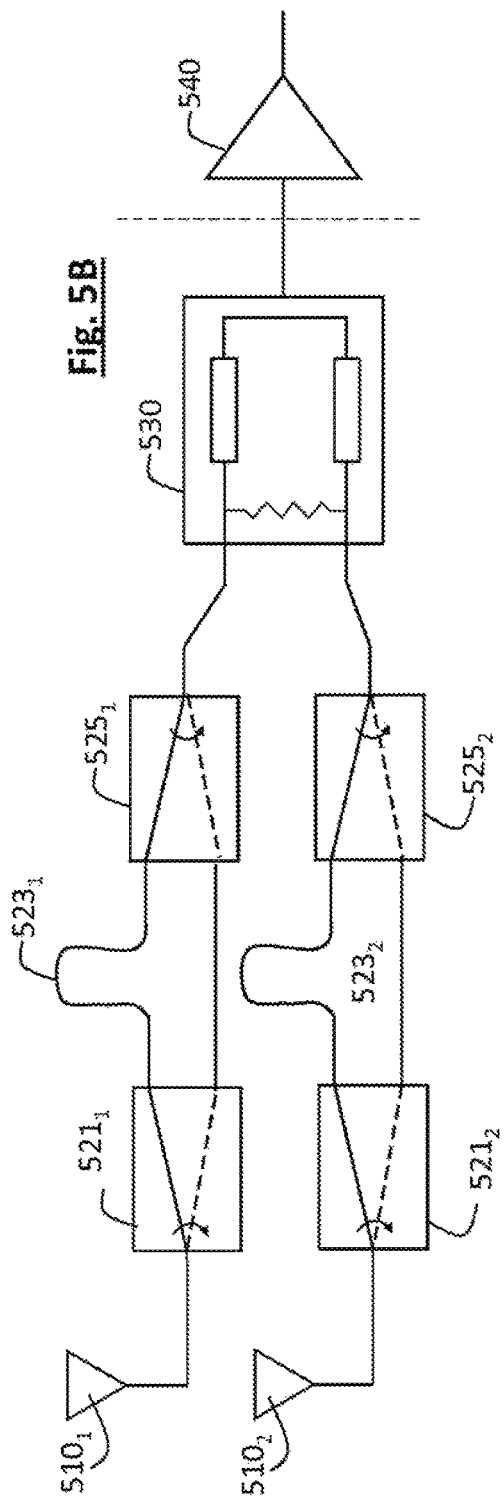

MULTI-ANTENNA IMPULSE UWB RECEIVER

TECHNICAL FIELD

The present invention relates in general to multi-antenna impulse UWB (Ultra Wide Band) receivers, in particular for MIMO-UWB (Multiple Input Multiple Output UWB) telecommunications systems.

STATE OF THE PRIOR ART

UWB telecommunications systems are well known in the current state of the art. They have the specific feature of operating using ultra-wide spectral band (UWB) signals. The term UWB signal generally refers to a signal which complies with the spectral mask stipulated in the FCC regulation of Feb. 14, 2002, revised in March 2005, that is, in essence a signal in the spectral band from 3.1 to 10.6 GHz which exhibits a band width of at least 500 MHz at −10 dB.

UWB signals can be divided into two main categories: OFDM (MB-OFDM) multi-band signals and impulse UWB or IR-UWB (Impulse Radio UWB) signals. An IR-UWB signal is made up of very short pulses, with a duration $T_p$, of the order of several hundred picoseconds to 1 or 2 nanoseconds, which repeat at a repetition frequency (Pulse Repetition Frequency), $f_{PRP}$. In what follows only IR-UWB signals will be considered.

UWB technology was used relatively early in multi-antenna or MIMO (Multiple Input Multiple Output) communications systems which, because of their spatial diversity, offer channel capacities which are substantially greater than conventional SISO (Single Input Single Output) systems. These systems are referred to by the acronym UWB-MIMO. If necessary, this spatial diversity can supplemented by temporal diversity by using space-time encoding. A general presentation of UWB-MIMO systems can be found in the article by T. Kaiser et al. entitled "An overview of Ultra-Wide-Band systems with MIMO" published in Proc. of the IEEE, vol. 97, No. 2, pp. 285-312.

FIG. 1 shows the conventional architecture of a UWB-MIMO receiver.

This receiver comprises a plurality M of antennas, $110_1, \ldots, 110_M$, which receive an RF signal from a transmitter (or RF signals from several transmitters). The received signals are processed by RF processing modules, also known as RF front-end modules $120_1, \ldots, 120_M$. A RF front-end typically comprises a low-noise amplifier (LNA), a mixer to translate the signal to base-band and an analogue-digital converter. The base-band signals are then processed by treatment modules into base-bands $130_1, \ldots, 130_M$ before being supplied to a MIMO processing module (MIMO DSP), 140. The MIMO DSP module may, for example, determine an input direction, undertake beam formation on reception, spatial decoding or space-time decoding.

Such an architecture, however, has the drawback of needing an RF front-end for each receiving antenna. It is therefore bulky in terms of surface area occupied in an integrated circuit and is energy-hungry. It may be suitable for applications when complexity and energy consumption are not priorities (for example a base station) but becomes problematical where there are constraints on resources (mobile terminals for example).

In the field of narrow-band MIMO systems, the sharing of an RF front-end between several processing channels of a multi-antenna receiver is known. This sharing is achieved using code multiplexing upstream of the RF front-end and demultiplexing downstream of the latter. A description of such a multi-antenna receiver is to be found in the article by F. Tzeng et al. entitled "A CMOS code-modulated path-sharing multi-antenna receiver front-end" published in IEEE Journal of Solid State Circuits, vol. 44, No. 5, May 2009, pp. 1321-1335.

A shared front-end receiver architecture has been shown in FIG. 2.

The signal received by each antenna 210, is here multi-plied in 220, by a multiplexing code appropriate to the relevant processing channel, where the multiplexing codes for the various channels are chosen to be orthogonal. More precisely, Ie signal $r_i(t)$ received by the antenna 210, is spectrally spread by a chip frequency (code timing) code $c_i(t)$ which is a multiple (with a factor greater than or equal to M) of the signal bandwidth. The received signals spread in this way are then summed in 230, and their sum is sent to the shared RF front-end 240. The RF front-end output signal undergoes code demultiplexing. In other words, this output signal is correlated with the code $c_i(t)$ in respective suitable filters (or equivalently, correlators) $250_1, \ldots, 250_M$, where each signal thus de-spread corresponds to a channel.

This architecture substantially reduces the area allocated to RF processing, as well as its energy consumption. This simplification is however achieved at the cost of a stricter specification for the RF front-end, due to the increased bandwidth at its input. Thus, for example, if the RF front-end in question comprises an analogue-digital converter, this converter must be capable of maintaining the same input dynamic for a substantially higher bandwidth.

It should be noted that code multiplexing can take place at different stages of the RF front-end. Thus, for example, baseband multiplexing may be carried out and consequently only involve the baseband analogue processing and the analogue-digital conversion. Alternatively, it may be undertaken at the LNA level (CM-LNA or Code Modulating Low Noise Amplifier), where the remainder of the RF chain, with analogue baseband processing and analogue digital conversion is then shared.

Irrespective of the multiplexing level that is envisaged, it is not possible to significantly spread the spectral band of a UWB signal, by definition already greater than 500 MHz, in order to share a RF front-end in a multi-antenna impulse UWB receiver.

Consequently, one aim of the present invention is to propose a multi-antenna impulse UWB receiver which allows RF front-end sharing.

DESCRIPTION OF THE INVENTION

The present invention is defined by an impulse UWB receiver comprising a plurality M of antennas, where each antenna of the receiver receives an antenna signal, where said antenna signal is a impulse UWB signal formed from successive pulses modulated using a transmission code at a chip frequency, $f_{PRP}$, where an information symbol is encoded over $N_c$ successive pulses, where $N_c$ is the length of the transmission code, said receiver comprising:

a multiplexing stage, configured so as to multiplex the antennae signals using orthogonal codes in order to provide a multiplexed signal, where each orthogonal code is associated with a distinct antenna, the chip frequency of said orthogonal codes being equal to a sub-multiple $f_{PRP}/P$ of the chip frequency of the transmission code where $P < N_c$ is an integer divider of $N_c$;

an RF front-end which receives said multiplexed signal;
a demultiplexing stage configured to demultiplex the signal at the output from the RF front-end using said orthogonal codes, said demultiplexing stage supplying M demultiplexed signals corresponding to the various antennas.

The multiplexing stage advantageously comprises multipliers, each multiplier being configured to multiply each antenna signal by an orthogonal code associated with this antenna, where the various orthogonal codes are supplied to the multipliers at the frequency $f_{PRP}/P$, as well as an adder configured to sum the antenna signal multiplied in this way.

According to one embodiment example, M=2 and the antennas are differential antennae, where one antenna signal of a first differential antenna is supplied to a first input of a first switch and an opposite antenna signal, to a second input of said first switch, an antenna signal of a second differential antenna being supplied to a first input of a second switch and an opposite antenna signal, to a second input of said second switch, with a first output signal of said first switch being supplied to a first RF combining unit and a second output signal of said first switch being supplied to a second RF combining unit, a first output signal of said second switch being supplied to the first RF combining unit and a second output signal of the said second switch being supplied to the second RF combining unit, where the first and second switches switch their first and second inputs respectively towards their first and second outputs in a first switching position and towards their second and first outputs in a second switching position, where the first and second switches are controlled by orthogonal codes respectively associated with the first antenna and the second differential antenna, where the first RF combining unit combines the first output signal from the first switch and the first output signal from the second switch to supply a first combined signal, where the second RF combining unit combines the second output signal from the first switch and the second output signal from the second switch to provide a second combined signal, where the first and second combined signals are supplied to a differential input of the RF front-end.

The RF front-end advantageously comprises a differential low-noise amplifier, where the first and second combined signals are supplied to this amplifier as a differential input.

According to another embodiment example, each antenna signal is supplied to a first switch which switches it to a phase-shifter in a first switching position and to the second input of a second switch in a second switching position, where the first input of the second switch receives the antenna signal which has been phase shifted by the phase-shifter, where the second switch switches its first input to its output in a first switching position and its second input to its output in a second switching position, where the first and second switches are controlled by the orthogonal code associated with said antenna, where the output signals of the second switches are combined in a RF combining unit to supply said multiplexed signal to the RF front-end.

In this case the RF front-end advantageously comprises a low-noise amplifier, said multiplexed signal being supplied to the input of said amplifier.

Typically said pulses are sinusoidal at a central frequency $f_0$ and the RF front-end comprises a mixer in quadrature at this frequency in order to translate the multiplexed signal to baseband.

The RF front-end may comprise an analog-digital converter to convert the multiplexed signal to baseband.

Irrespective of the embodiment, the multiplexing stage advantageously comprises a plurality M of correlators, where each correlator is configured to correlate the output signal from the RF front-end over a time symbol with a composite code $$c_{\lfloor \frac{L}{P} \rfloor}^{m} c_l^{e},$$

$\ell = 0, \ldots, N_c-1$ where $c_l^e$, $\ell = 0, \ldots, N_c-1$ is the transmission code and $c_i^m$, $i=0, \ldots, N_p-1$, is the orthogonal code associated with the antenna m.

The receiver may furthermore comprise a multi-antenna processing stage which receives said M demultiplexed signals, said multi-antenna processing stage being configured to carry out processing from amongst beam formation, determination of input direction, a spatial or space-time decoding.

BRIEF DESCRIPTION OF THE DRAWINGS

Other characteristics and advantages of the invention will appear on reading a preferred embodiment of the invention, undertaken in reference to the attached figures, among which:

FIGS. 5A and 5B show embodiment examples of a code multiplexing stage for the receiver of FIG. 3.

DETAILED DESCRIPTION OF PARTICULAR EMBODIMENTS

In what follows we will consider an impulse UWB receiver which possesses M≥2 antenna. It should be recalled that an impulse UWB signal is formed of a sequence of successive modulated pulses at a repetition frequency $f_{PRP}=1/T_{PRP}$, which may be expressed in the form:

$$s(t) = \sum_{k=-\infty}^{+\infty} \sum_{j=0}^{N_c-1} p(t - kT_d - jT_c) c_j^e d_k \tag{1}$$

where $T_d = N_c T_c$ is the symbol duration, that is, the duration which corresponds to the transmission of an information symbol, $T_c$ is the chip period equal to the repetition period $T_{PRP}$, $c_j^e$, $j=0, \ldots, N_c-1$ is the code used on transmission where $c_j^e \in \{-1, +1\}$ in the case of a binary code, p(t) is the elementary impulse wave function and $d_k$ is an information symbol.

In another application context, the impulse UWB receiver may receive a IR-UWB radar signal. In this case, $d_k$ does not represent a symbol of information transmitted by a transmitter, but simply the complex amplitude of the signal reflected by the target.

The bandwidth of the impulse UWB signal is given by the bandwidth (>500 MHz) of the elementary pulse of duration of the order of 1 to 2 ns, whereas the modulation bandwidth of the information symbols corresponds to the repetition frequency $f_{PRP}=1/T_{PRP}$ where generally $T_{PRP}$ is of the order of 16 to 128 ns.

The basic concept of the present invention is to take advantage of the fact that the modulation bandwidth is significantly smaller than the bandwidth of the IR-UWB signal in order to undertake orthogonal codes multiplexing, without broadening the latter.

Figure 1:
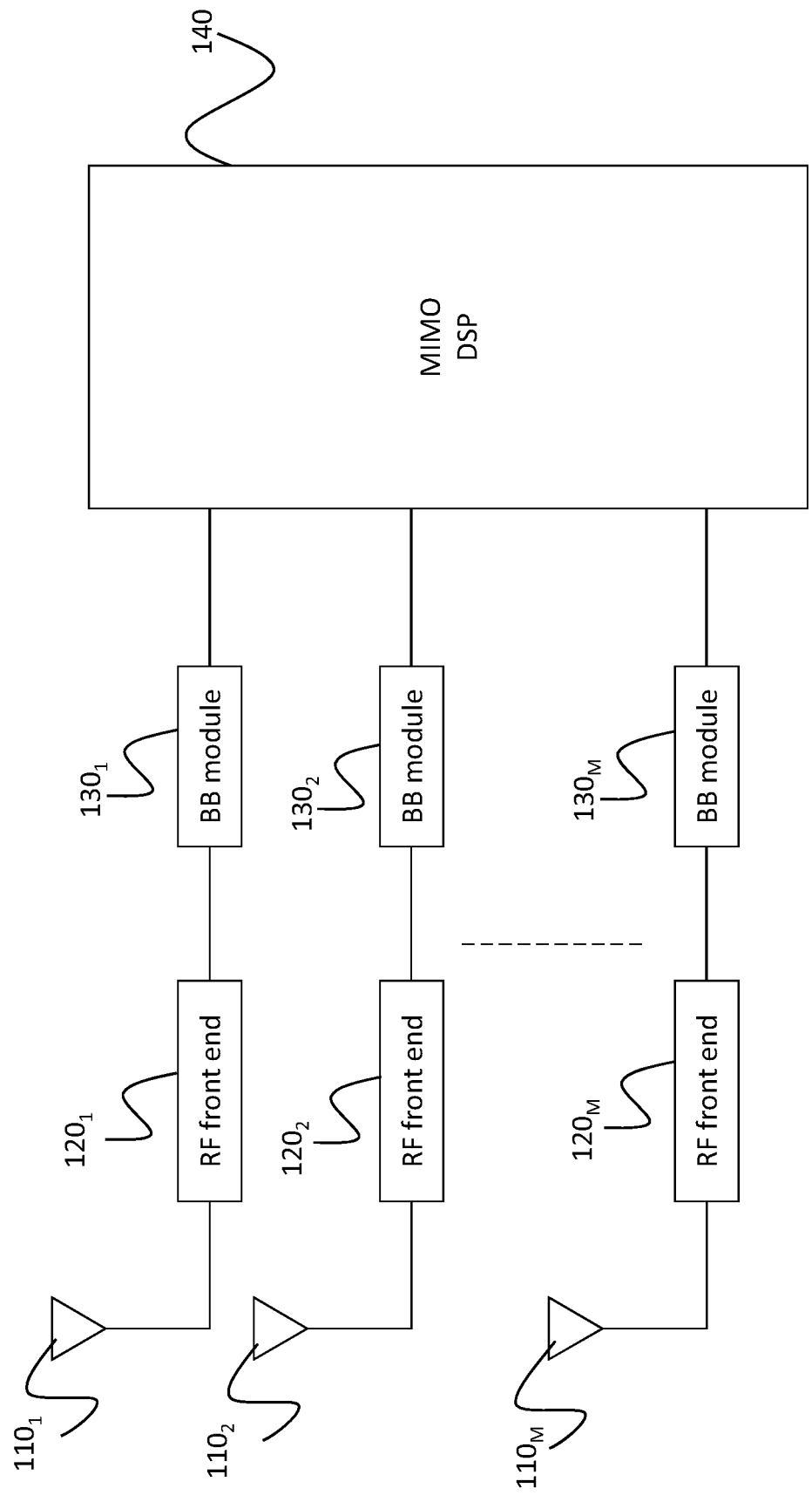
FIG. 1, already described, schematically shows the architecture of a UWB-MIMO system receiver known in the prior art.
Figure 2:
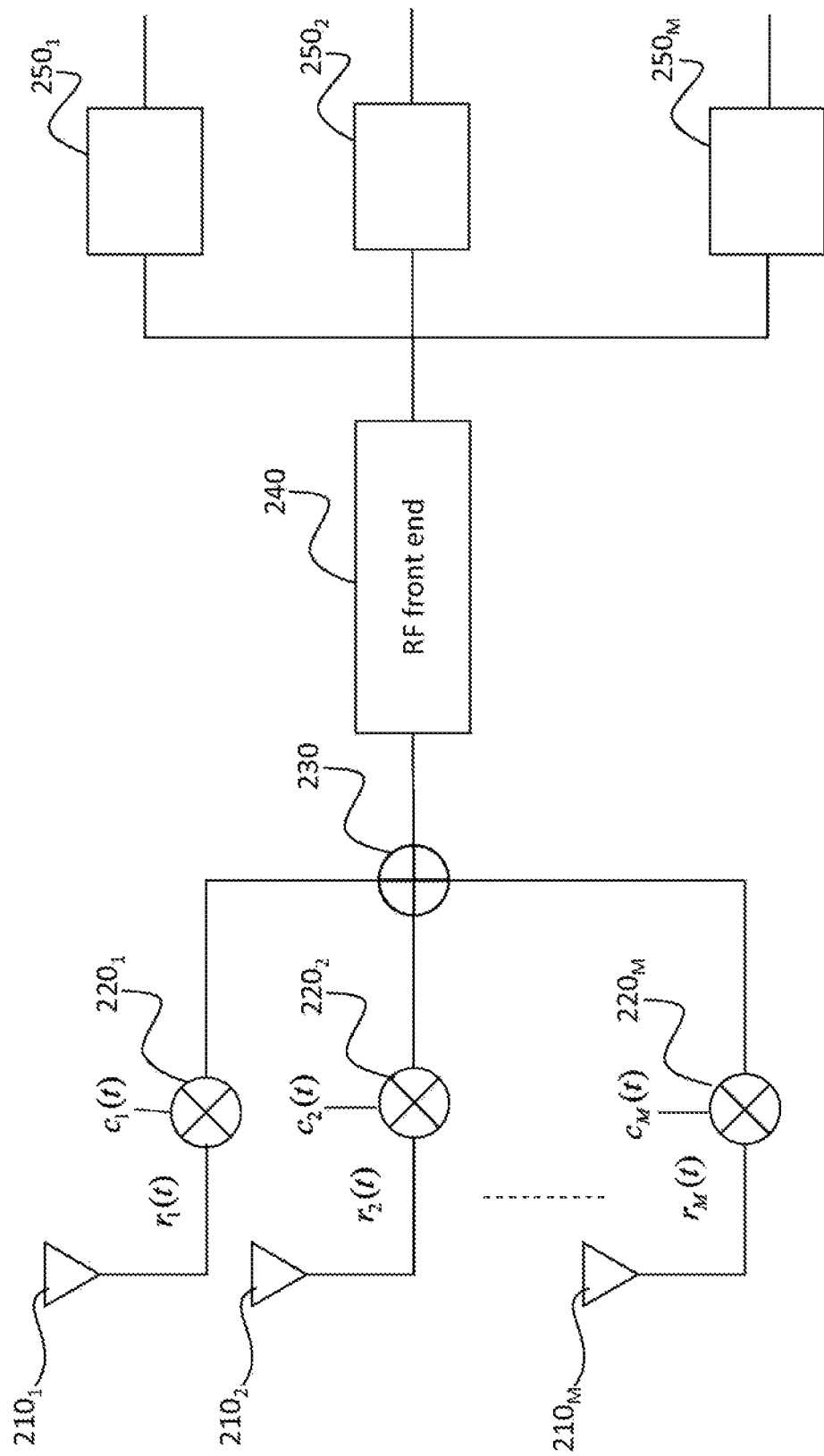
FIG. 2, already described, shows a narrow-band MIMO system receiver wherein a RF front-end is shared by code multiplexing.
Figure 3:
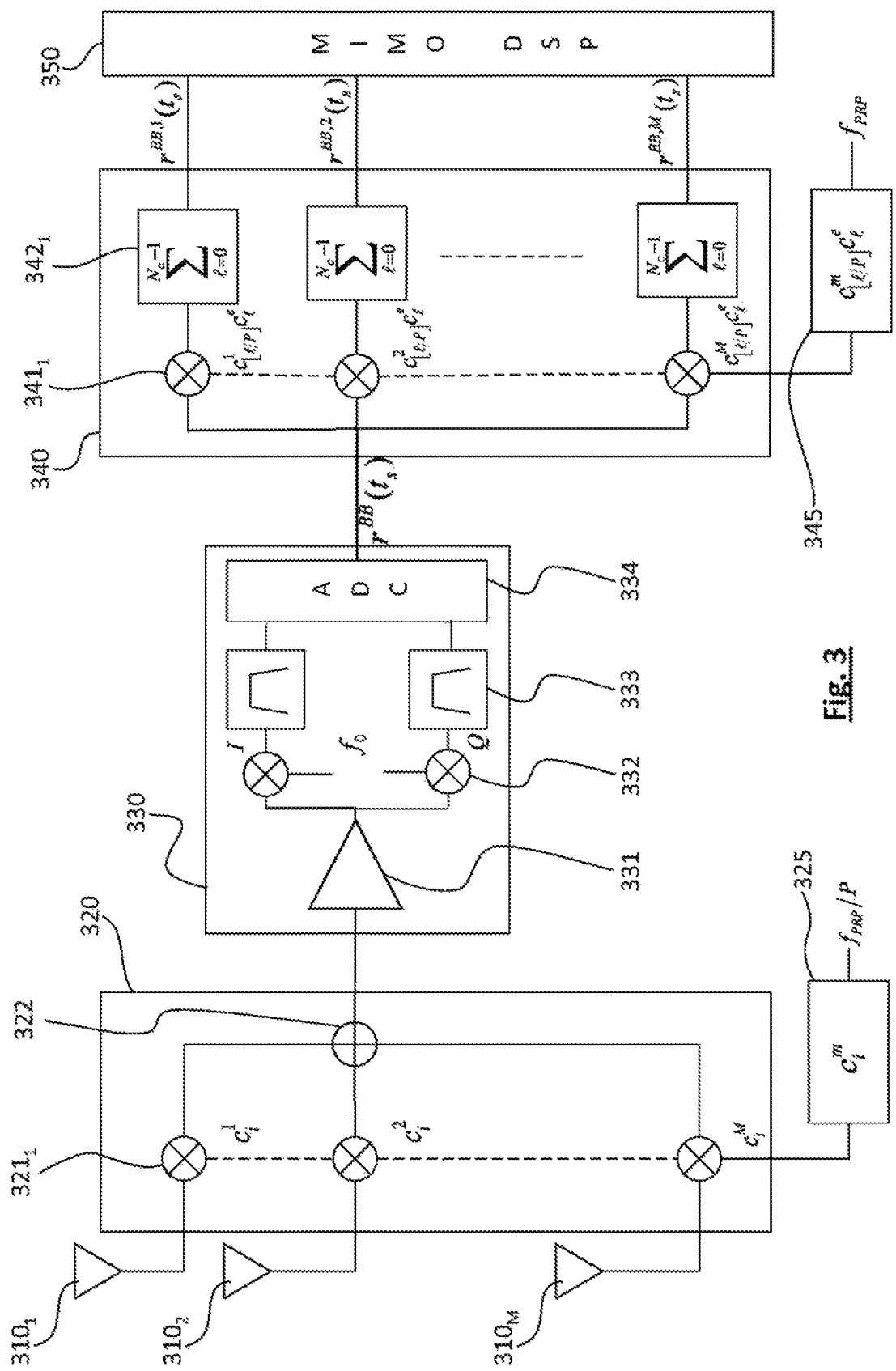
FIG. 3 schematically shows a IR-UWB multi-antenna receiver wherein an RF front-end is shared using code multiplexing, according to one embodiment of the invention.

FIG. 3 schematically shows a IR-UWB multi-antenna receiver wherein a RF front-end is shared using code multiplexing, according to one embodiment of the invention.

The multi-antenna UWB receiver 300 comprises a plurality of antennas $310_1, \ldots, 310_M$, a code multiplexing stage, 320, where the signal received by an antenna $310_m$ is multiplied in $321_m$ by a code, known as a multiplexing code, defined by the sequence $c_j^m$, $i=0, \ldots, N_p-1$ where $c_i^m \in \{-1, +1\}$, in the case of a binary code, and $N_p$ is the code length, chosen to be equal to a sub-multiple of $N_c$, in other words $$N_p = \frac{N_c}{P}$$

where $1<P<N_c$.

The codes $c_i^m$, $i=0, \ldots, N_p-1$ are chosen to be orthogonal, in other words:

$$\sum_{i=0}^{N_p-1} c_i^m c_i^{m'} = N_p \delta_{m,m'} \quad (2)$$

where $\delta_{m,m'}$ is the Kronecker symbol. Hadamard codes could, for example, be used for this purpose.

The signals at the output of the codes multiplexing step stage are summed in 322 and the resulting signal is supplied to the RF front-end shared between the M channels, 340. The latter may comprise, for example, a low-noise amplifier (LNA), 331, a mixer at the central frequency $f_0$ of the impulses (when they have a sinusoidal shape), 322, a bandwidth filtering unit, 333, an analog digital converter, 334.

The output signal of the RF front-end is then demultiplexed in a demultiplexing stage 340 in order to restore the signals which correspond to the various channels, where these signals are supplied to the multi-antenna processing module (MIMO DSP), 350.

The multi-antenna processing module can carry out any processing whatsoever of the demultiplexed signals, for example beam formation in one or more directions, the determination of an input direction, spatial decoding or space-time decoding, in a manner which is known per se.

The signal received by the antenna m after multiplication by the multiplexing code $c_i^m$, $i=0, \ldots, N_p-1$ may be written in the form:

$$r^m(t) = \sum_{k=-\infty}^{+\infty} \sum_{i=0}^{N_p-1} \sum_{j=0}^{P-1} p(t - kT_d - (iP+j)T_c - \tau^m) c_i^m c_{iP+j}^e d_k \quad (3)$$

where $\tau^m$ is the antenna m reception lag.

The signal at the output of the adder 322 is expressed as follows:

$$r(t) = \sum_{k=-\infty}^{+\infty} \sum_{m=1}^{M} \sum_{i=0}^{N_p-1} \sum_{j=0}^{P-1} p(t - kT_d - (iP+j)T_c - \tau^m) c_i^m c_{iP+j}^e d_k \quad (4)$$

At the output of the RF front-end, 330, the baseband digital signal, $r^{BB}$(t), is correlated with the composite code $c_i^m c_{iP+j}^e$, $j=0, \ldots, P-1$, $i=0, \ldots, N_p-1$ of length $N_c=PN_p$ in order to restore the signal of the channel m, after processing by the RF front-end.

If the processing (assumed to be linear) of the RF front-end is $\Lambda$, the input to the multiplexing stage may be written as:

$$r^{BB}(t_s) = \sum_{k=-\infty}^{+\infty} \sum_{m=1}^{M} \sum_{i=0}^{N_p-1} \sum_{j=0}^{P-1} \Lambda(p(t_s - kT_d - (iP+j)T_c - \tau^m)) c_i^m c_{iP+j}^e d_k \quad (5)$$

where $t_s$ represents a sampling instant, where the sampling frequency is assumed to be equal to $f_{PRP}=1/T_c$.

The signal $r^{BB}(t_s)$ may be expressed more simply, after changing the index:

$$r^{BB}(t_s) = \sum_{k=-\infty}^{+\infty} \sum_{m=1}^{M} \sum_{l=0}^{N_c-1} \Lambda(p(t_s - kT_d - lT_c - \tau^m)) c_{\lfloor \frac{l}{P} \rfloor}^m c_l^e d_k \quad (5')$$

After correlation with the composite code $$c_{\lfloor \frac{l}{P} \rfloor}^m c_l^e,$$

$l=0, \ldots, N_c-1$, by multiplication in $341_m$ and adding in $342_m$, the signal relating to the channel/antenna m is:

$$r^{BB,m}(t_s) = N_c \sum_{k=-\infty}^{+\infty} \Lambda(p(t_s - kT_d - \tau^m)) d_k \quad (6)$$

since $$c_{\lfloor \frac{l}{P} \rfloor}^m c_l^e c_{\lfloor \frac{l}{P} \rfloor}^m c_l^e = 1.$$

This signal is in face, to the nearest scalar factor, that which would have been supplied by an RF front-end dedicated to the channel m in a conventional architecture. The inter-channel interferences are completely eliminated thanks to the orthogonality of the multiplexing codes.

It has been assumed above that the correlation was undertaken in a single pass with the composite code. Those skilled in the art will however understand that it may be achieved in an equivalent manner by a first multiplication pass with the transmission code followed by a second correlation pass with the orthogonal code, or conversely.

In expressions (3) to (6), we have ignored the noise term. It will be seen however that if there is independent additive white Gaussian noise at the various reception antenna, the deterioration of the output signal-to-noise ratio is not at the maximum of 10 $\log_2(M)$ (due to the summation of the signals of the various channels), something which is generally acceptable.

Finally, we assumed in expressions (3) to (6) that the transition times between code chips $c_i^m$, $i=0, \ldots, N_p-1$ were negligible; in other words that the transition edges between successive chips of the code, $c_i^m$, $c_{i+1}^m$, were perfectly steep. In practice, as we will see later, these transition times are not zero. However, as long as they remain small relative to the repetition period $T_c$ and the lag times $\tau^m$, $m=1, \ldots, M$, expression (6) remains valid. On the other hand, if this is not the case the chips may be modelled using an approximately trapezoidal form, $w_{\tau_c}(t)$, such as $w_{\tau_c}(t)=1$, $\tau_c \leq t \leq PT_c-\tau_c$, which increases linearly from 0 to 1 between $i=\tau_c$, then decreases linearly from 1 to 0 between $t=PT_c-\tau_c$ and $t=PT_c$. Expression (5) then becomes:

$$r^{BB,m}(t_s) = \sum_{k=-\infty}^{+\infty} \sum_{i=0}^{N_p-1} \sum_{j=0}^{P-1} \Lambda(p(t_s - kT_d - (iP+j)T_c - \tau^m))w_{\tau_c}(t_s - kT_d - iPT_c)d_k \quad (7)$$

Figure 4:
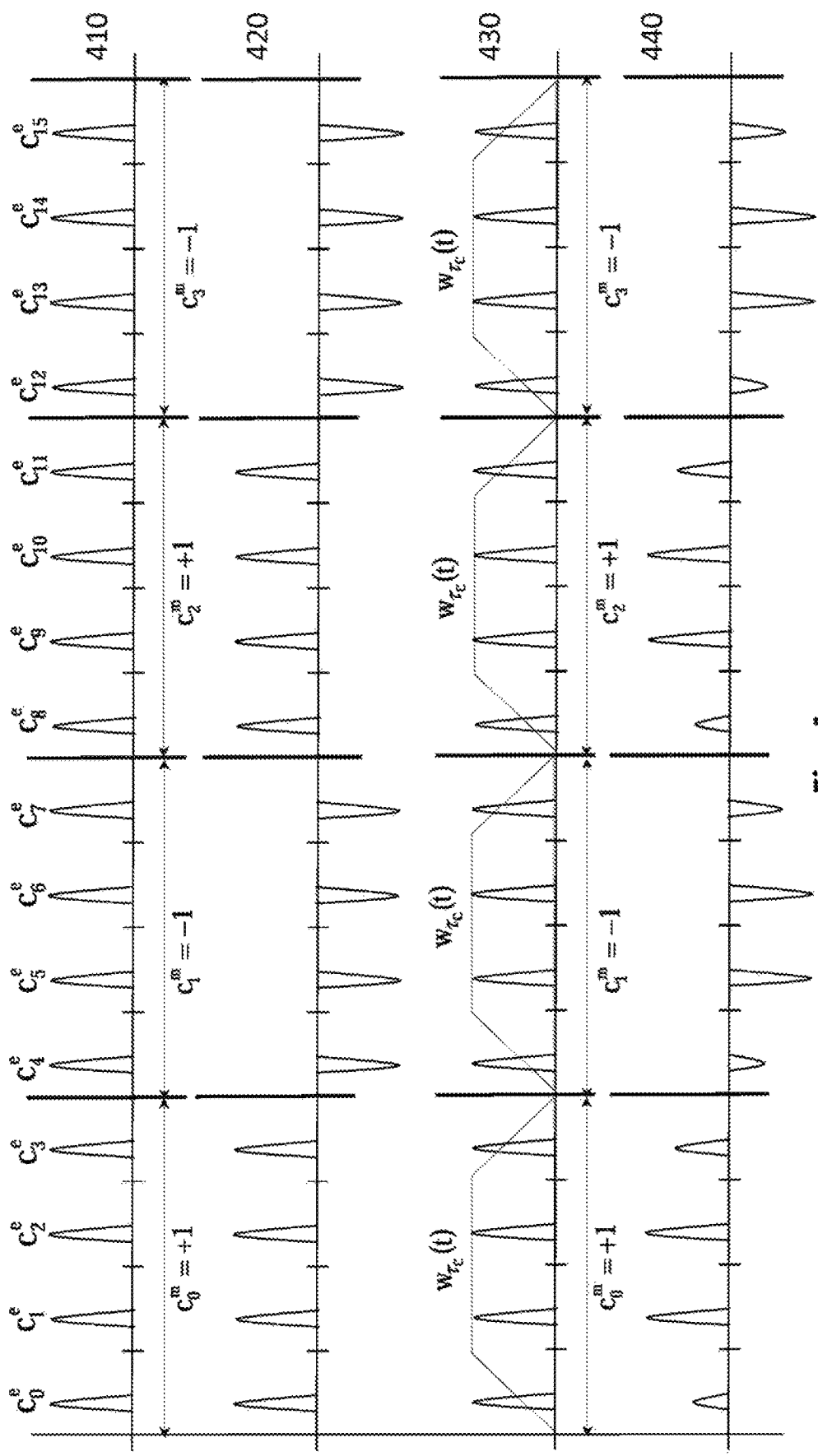
FIG. 4 shows the effect of imperfect transition codes in the multiplexing stage of the system in FIG. 3.

FIG. 4 shows the situation where the code chips exhibit imperfect transitions, in other words where the transition times between successive chips are no longer negligible in terms of $T_c$ or the lag times $\tau^m$.

In 410 an antenna signal is shown which corresponds to the reception of a symbol. The time interval involved is therefore a symbol time namely $N_cT_c$. Modulation at transmission is here achieved by a code of length $N_c=16$ chips and code multiplexing is achieved by a code of length $N_p=4$ chips. To simplify representation the modulation code chips have here all been taken to be equal to 1. The multiplexing code has been taken to be equal to $\{+1, -1, +1, -1\}$.

Shown in 420 is the same signal after multiplexing by the multiplexing code $c_i^m$, $i=0, \ldots, N_p-1$, when there are perfect chip transitions.

By comparison, 430 and 440 respectively show the same antenna signal before and after multiplication by the multiplexing code when the transitions between chips are imperfect.

It can be seen that impulses at the limits of the multiplexing code chips, in other words in the transition periods, are attenuated. This attenuation is more or less random, since it depends on the position of the pulses of the IR-UWB signals in relation to the multiplexing code transitions. After demultiplexing, the signal therefore exhibits an overall attenuation and distortion, since the different modulation codes will be attenuated to differing extents.

In order to reduce this distortion, it is possible to choose a "slower" multiplexing code, in other words a smaller length $N_p$ (higher P). Thus, for a given symbol, the proportion of pulses at the limit of the multiplexing code bribes will be smaller and the resulting signal less attenuated and distorted.

Alternatively, weighting of the samples at the limit of the chips can be performed in the demultiplexing stage in order to eliminate or reduce the contributions of the distorted impulses.

For example, the samples could be windowed, retaining only those such that $\tau_c+kT_d+iPT_c \leq t_s \leq kT_d+(P+1)T_c-\tau_c$. In this case the signal of channel m at the outlet of the multiplexing stage could be written as:

$$r^{BB,m}(t_s) = \sum_{k=-\infty}^{+\infty} \sum_{i=0}^{N_p-1} \sum_{j=0}^{P-1} \Lambda(p(t_s - kT_d - (iP+j)T_c - \tau^m))G(t_s - kT_d - iPT) \quad (8)$$

$$w_{\tau_c}(t_s - kT_d - iPT_c)d_k$$

where $G(t)$ is windowing function such that $G(t)=1$ for $\tau_c \leq t \leq PT_c-\tau_c$ and $G(t)=0$ otherwise.

This elimination of samples at the limit of the chips may nevertheless adversely affect between-channel orthogonality, but this adverse effect will be small if the multiplexing code is slow in the above sense.

FIG. 5A shows a first embodiment example of a code multiplexing stage, 500, for the multi-antenna IR-UWB receiver in FIG. 4.

In this example, the number of antennae is taken to be equal to M=2.

Both reception antennas, 510$_1$ and 510$_2$, are differential antennas. By definition, a differential reception antenna is a symmetrical antenna which supplies two reception signals which are identical but which are out of phase.

The two opposite signals at the outlet of the first differential antenna 510$_1$ are supplied, respectively, to a first input and to a second input of a first DPDT switch 520$_1$. Similarly, the two opposite signals at the outlet of the second differential antenna 510$_2$ are supplied, respectively, to a first input and to a second input of the second DPDT switch 520$_2$. Both switches 520$_1$ and 520$_2$ are switched in time with the multiplexing code, namely $f_{PRP}/P$, with the first switch being controlled by the code $c_i^1$, $i=0, \ldots, N_p-1$, and the second by $c_i^2$, $i=0, \ldots, N_p-1$.

Each of the two DPDT switches switch their first and second inputs respectively to their first and second outputs, in a first switching position and, respectively, to their second and first outputs in a second switching position.

The first output of the first switch 520$_1$ and the first output of the second switch 520$_2$ are combined in a first RF combining unit, 530$_1$. Similarly the second output of the first switch 520$_1$ and the second output of the second switch 520$_2$ are combined in a second RF combining unit, 530$_2$. Thus, depending on the respective switching positions of the two switches 520$_1$ and 520$_2$, $c_i^1 s_1 + c_i^2 s_2$ where $c_i^1 \in \{-1, +1\}$, $c_i^2 \in \{-1, +1\}$, appear on the two outputs of the RF combining units, where the signals at the output of the two RF combining units are out of phase. These two signals are then supplied to the inputs of a low-noise differential amplifier (LNA), 540, of the shared RF front-end.

FIG. 5B shows a second example of implementation of a code multiplexing stage, 500, for the IR-UWB multi-antenna receiver of FIG. 4.

In this second embodiment example, the receiver may comprise an arbitrary number M≥2 of antennas.

The signal received by an antenna 510$_m$ is switched by a first SPDT switch, 521$_m$, either to a first output connected to the first end of a half-wave delay line, 523$_m$, where the wave length corresponds to the central frequency of the elementary impulse of the IR-UWB signal) or to a second output. The second end of the delay line is connected to a first input of a second switch 525$_m$ and the second output of the first switch is connected directly to a second input of the second switch. Switches $521_m$ and $525_m$ are controlled by the same switching signal. In a first switch position, the signal received by the antenna $510_m$ is delayed by the half-wave line before being supplied at the output of the second switch. In a second position of the switches, the signal received by the antenna is supplied directly to the output of the second switch.

It should be noted that the half-wave line simply acts as a phase shifter and in theory only inverts a narrow-band signal around the frequency $f=c/\lambda$, it can however be used in practice for an IR-UWB signal of bandwidth 1-2 GHz. Alternatively, LC cells could be used instead of the half-wave line to undertake the phase shift of $\pi$ at the central frequency.

In all cases, the outputs of the second switches $525_m$, m=1, ..., M are combined in a combining unit RF 530 and the resulting signal is supplied to the low noise amplifier 540 of the shared RF front-end.

Advantageously those skilled in the art can incorporate the switches and combiners within the low-noise amplifier, in accordance with the aforementioned CM-LNA technique, in order to reduce the additional noise and losses.

Finally, those skilled in the art will understand that in both embodiment examples shown in FIGS. 5A and 5B, the RF signals are not advantageously divided by 2 (using a 3 dB splitter) in the multiplexing stage. The only possible losses are due to the switches. Similarly, the bandwidth of the multiplexing stage is only limited by the bandwidth of the switches and, in the second embodiment example, by the bandwidth of the phase shifter.

The invention claimed is:

1. An impulse UWB receiver comprising:
a plurality M of antennas, where each antenna of the receiver receives an antenna signal, where said antenna signal is an impulse UWB signal formed from successive pulses modulated using a transmission code at a chip frequency, $f_{PRP}$, where an information symbol is encoded over $N_c$ successive pulses, where $N_c$ is the length of the transmission code;
a multiplexing stage configured to multiplex, the antenna signals using orthogonal codes in order to provide a multiplexed signal, where each orthogonal code is associated with a distinct antenna, the chip frequency of said orthogonal codes being equal to a sub-multiple $f_{PRP}/P$ of the chip frequency of the transmission code where $P<N_c$ is an integer divider of $N_c$;
a RF front-end which receives said multiplexed signal; and
a demultiplexing stage configured to demultiplex the signal at the output from the RF front-end using said orthogonal codes, said demultiplexing stage supplying M demultiplexed signals corresponding to the various antennas.

2. The impulse UWB receiver according to claim 1, wherein the multiplexing stage comprises multipliers, each multiplier being configured to multiply each antenna signal by an orthogonal code associated with said antenna, where the various orthogonal codes are supplied to the multipliers at the frequency $f_{PRP}/P$, as well as an adder configured to sum the multiplied antenna signal.

3. The impulse UWB receiver according claim 1, wherein M=2 and the antennas are differential antennas, where one antenna signal of a first differential antenna is supplied to a first input of a first switch and an opposite antenna signal, to a second input of said first switch, an antenna signal of a second differential antenna being supplied to a first input of a second switch and an opposite antenna signal, to a second input of said second switch, a first output signal of said first switch being supplied to a first RF combining unit and a second output signal of said first switch being supplied to a second RF combining unit, a first output signal of said second switch being supplied to the first RF combining unit and a second output signal of the said second switch being supplied to the second RF combining unit, where the first and second switches switch their first and second inputs respectively towards their first and second outputs in a first switching position and towards their second and first outputs in a second switching position, where the first and second switches are controlled by orthogonal codes respectively associated with the first antenna and the second differential antenna, where the first RF combining unit combines the first output signal from the first switch and the first output signal from the second switch to supply a first combined signal, where the second RF combining unit combines the second output signal from the first switch and the second output signal from the second switch to provide a second combined signal, where the first and second combined signals are supplied to a differential input of the RF front-end.

4. The impulse UWB receiver according to claim 3, wherein the RF front-end comprises a differential low-noise amplifier, where the first and second combined signals are supplied to this amplifier as a differential input.

5. The impulse UWB receiver according to claim 1, wherein each antenna signal is supplied to a first switch which switches it to a phase shifter in a first switching position and to the second input of a second switch in a second switching position, where the first input of the second switch receives the antenna signal which has been phase shifted by the phase shifter, where the second switch switches its first input to its output in a first switching position and its second input to its output in a second switching position, where the first and second switches are controlled by the orthogonal code associated with said antenna, where the output signals of the second switches are combined in a RF combining unit to supply said multiplexed signal to the RF front-end.

6. The impulse UWB receiver according to claim 5, wherein the RF front-end comprises a differential low-noise amplifier, where said multiplexed signal is supplied to the input of said amplifier.

7. The impulse UWB receiver according to claim 1, wherein said impulses are sinusoidal with a central frequency $f_0$ and the RF front-end comprises a mixer in quadrature at this frequency in order to translate the multiplexed signal to baseband.

8. The impulse UWB receiver according to claim 7, wherein the RF front-end comprises an analogue-digital converter to convert the multiplexed signal to baseband.

9. The impulse UWB receiver according to claim 1, wherein the demultiplexing stage comprises a plurality M of correlators, where each correlator is configured to correlate the output signal from the RF front-end over a time symbol with a composite code $$c^m_{\left\lfloor \frac{l}{P} \right\rfloor} c^e_l,$$

l=0, ..., $N_c$−1 where $c^e_l$, l=0, ..., $N_c$−1 is the transmission code and $c^m_i$, i=0, ..., $N_p$−1, is the orthogonal code associated with the antenna of index m.

10. The impulse UWB receiver according to claim 1, further comprising a multi-antenna processing stage which receives said M demultiplexed signals and configured to carry out processing chosen from beam formation, input direction determination, spatial decoding or space-time decoding.

* * * * *